US008401217B2

(12) United States Patent
Shams et al.

(10) Patent No.: US 8,401,217 B2
(45) Date of Patent: Mar. 19, 2013

(54) EXTREME LOW FREQUENCY ACOUSTIC MEASUREMENT SYSTEM

(75) Inventors: Qamar A. Shams, Yorktown, VA (US); Allan J. Zuckerwar, Williamsburg, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 1228 days.

(21) Appl. No.: 11/780,500

(22) Filed: Jul. 20, 2007

(65) Prior Publication Data
US 2009/0022341 A1    Jan. 22, 2009

(51) Int. Cl.
*H04R 1/20*     (2006.01)
(52) U.S. Cl. .................... 381/353; 381/345; 381/352
(58) Field of Classification Search .............. 381/191, 381/345, 346, 347, 355, 359, 360, 369, 349, 381/352, 353
See application file for complete search history.

(56) References Cited

U.S. PATENT DOCUMENTS

| 4,281,222 | A | | 7/1981 | Nakagawa et al. |
| 5,226,076 | A | | 7/1993 | Baumhauer, Jr. et al. |
| 5,511,130 | A | | 4/1996 | Bartlett et al. |
| 5,684,324 | A | * | 11/1997 | Bernstein ............... 257/415 |
| 5,790,679 | A | | 8/1998 | Hawker et al. |
| 6,108,415 | A | | 8/2000 | Andrea |
| 6,570,500 | B1 | | 5/2003 | Pieper |
| 6,626,822 | B1 | * | 9/2003 | Jaeger et al. ............... 600/25 |
| 6,831,978 | B2 | | 12/2004 | Kilion et al. |
| 6,975,736 | B2 | | 12/2005 | Hasegawa |
| 7,065,224 | B2 | | 6/2006 | Cornelius et al. |
| 7,110,553 | B1 | | 9/2006 | Julstrom et al. |
| 2003/0055359 | A1 | * | 3/2003 | Halleck et al. ............ 600/586 |
| 2005/0025328 | A1 | * | 2/2005 | Song ....................... 381/369 |
| 2007/0003095 | A1 | | 1/2007 | Slamka et al. |
| 2007/0053538 | A1 | | 3/2007 | Jensen |

OTHER PUBLICATIONS

Qamar A. Shams, et al., "Compact Nonporous Windscreen for Infrasonic Measurements", Journal of Acoustic Society Am, 118(3) Pt. 1, Sep. 2005, pp. 1335-1340.
NASA Langley Research Center, Hampton, VA, Sep. 1, 2005 Compact Infrasonic Windscreen—High Values of Infrasound-Transmission and Wind-Noise-Attenuation Coefficients Can be realized.

* cited by examiner

*Primary Examiner* — Alexander Jamal
(74) *Attorney, Agent, or Firm* — Robin W. Edwards; Helen M. Galus

(57) ABSTRACT

The present invention is an extremely low frequency (ELF) microphone and acoustic measurement system capable of infrasound detection in a portable and easily deployable form factor. In one embodiment of the invention, an extremely low frequency electret microphone comprises a membrane, a backplate, and a backchamber. The backchamber is sealed to allow substantially no air exchange between the backchamber and outside the microphone. Compliance of the membrane may be less than ambient air compliance. The backplate may define a plurality of holes and a slot may be defined between an outer diameter of the backplate and an inner wall of the microphone. The locations and sizes of the holes, the size of the slot, and the volume of the backchamber may be selected such that membrane motion is substantially critically damped.

25 Claims, 7 Drawing Sheets

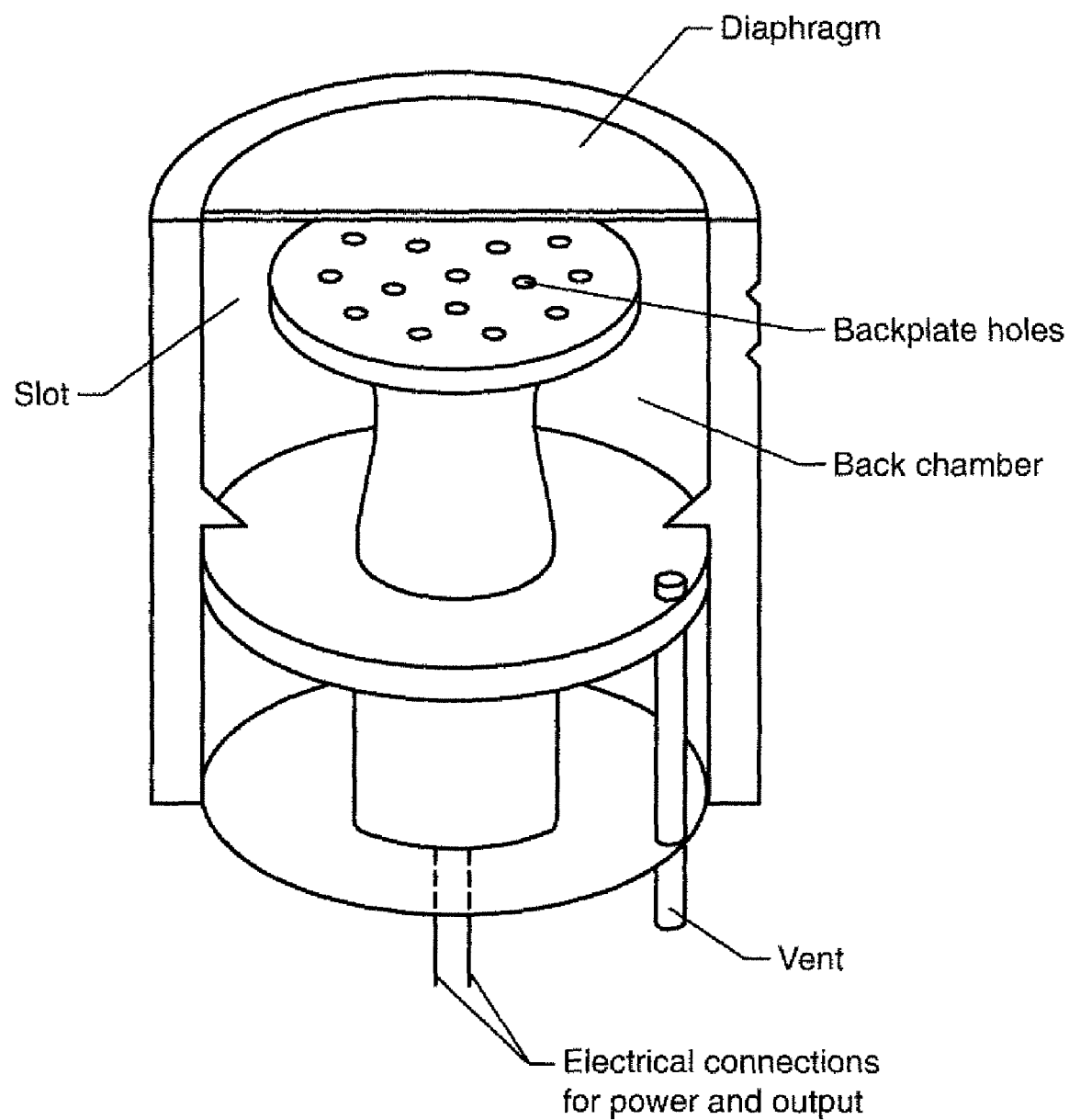
Fig. 1 Known Art

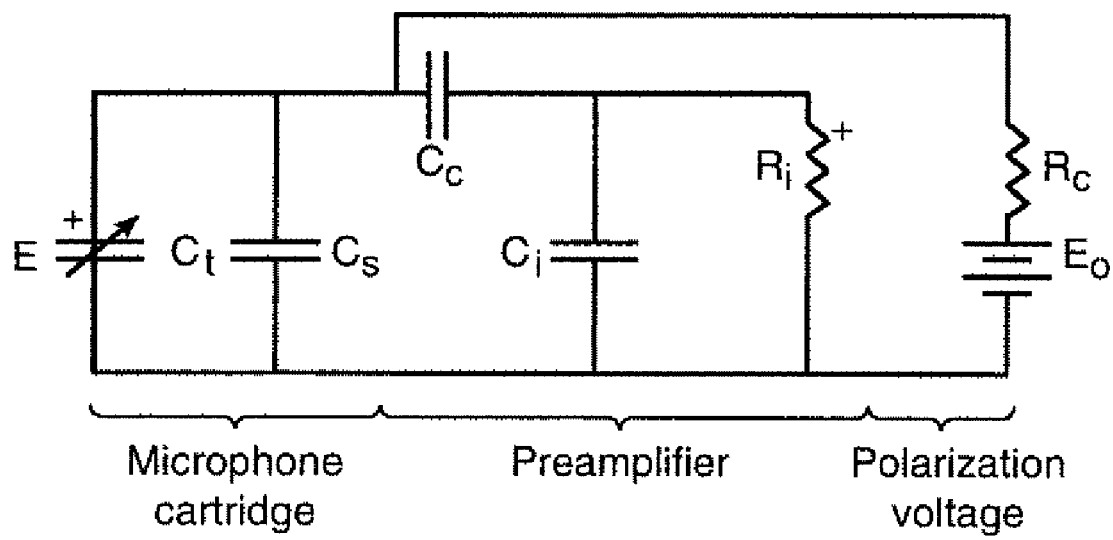
Fig. 2(a). Known Art
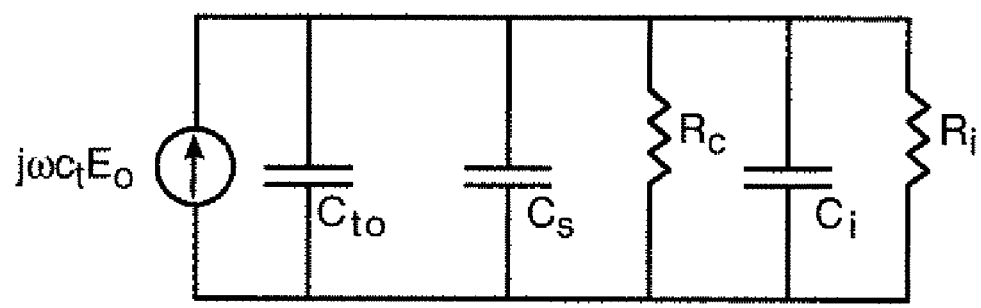
Fig. 2(b). Known Art

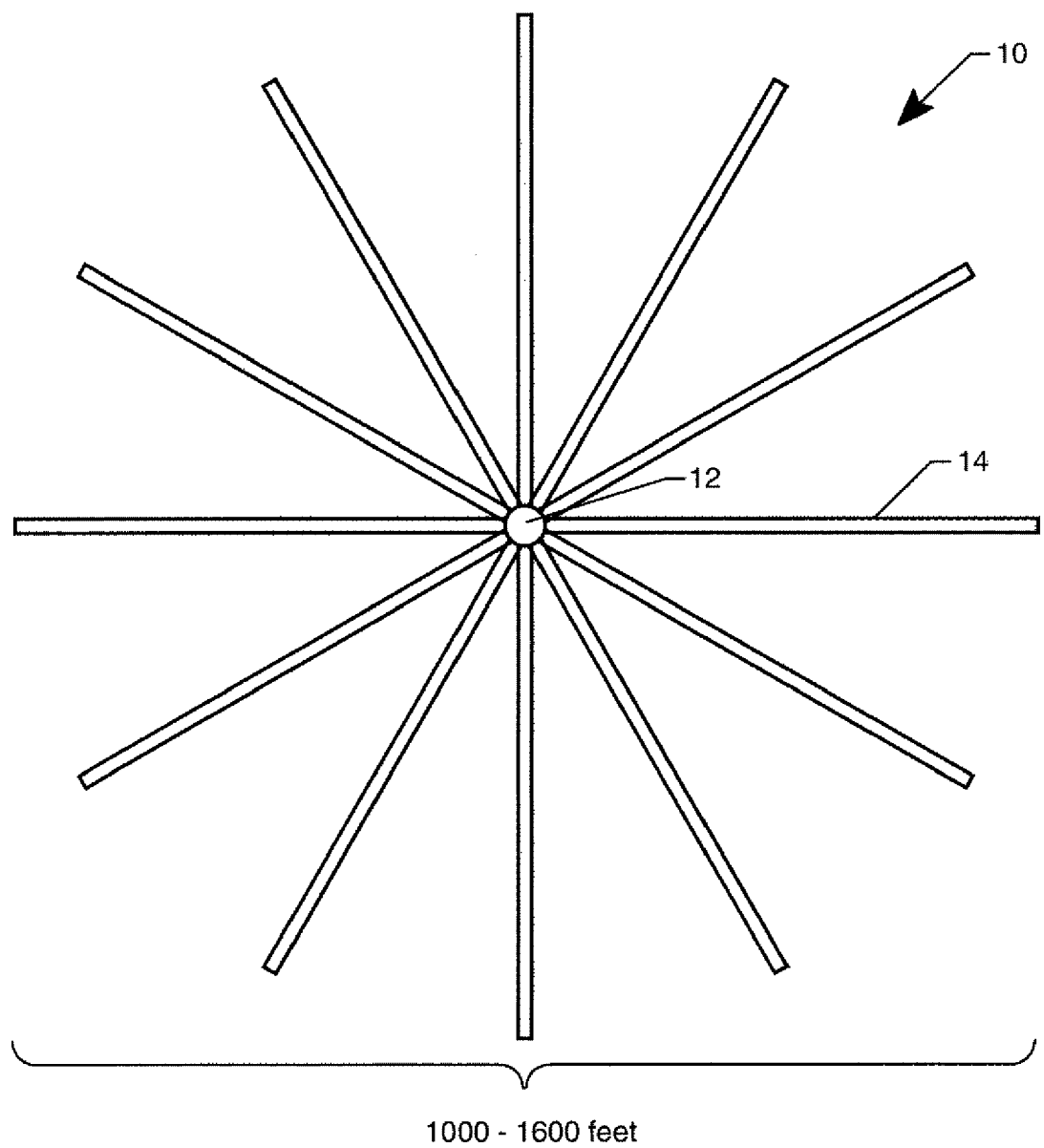
1000 - 1600 feet
Fig. 3  Known Art

EXTREME LOW FREQUENCY ACOUSTIC MEASUREMENT SYSTEM

STATEMENT REGARDING FEDERALLY SPONSORED RESEARCH OR DEVELOPMENT

The invention described herein was made by employees of the United States Government and may be manufactured and used by or for the Government of the United States of America for governmental purposes without the payment of any royalties thereon or therfore.

FIELD OF THE INVENTION

The present inventions generally relate to acoustic measurement systems and, more particularly, relates to acoustic measurement systems capable of acoustic measurement at extremely low frequencies.

BACKGROUND OF THE INVENTION

Sound at frequencies below 20 Hz is termed "infrasound." A particularly favorable property of infrasound is its propagation over long distances with little attenuation. Infrasound has this property because atmospheric absorption is practically negligible at infrasonic frequencies, and because there is an acoustic "ceiling" in the stratosphere where a positive gradient of the speed of sound versus altitude causes reflections of infrasonic rays back to Earth. Infrasound propagation over long distances (e.g., thousands of kilometers) is predominantly due to refractive ducting from the upper layers in the atmosphere, while propagation over short distances is completed by direct path.

Infrasound is radiated by a variety of geophysical processes including earthquakes, severe weather events, volcanic activity, ocean waves, avalanches, turbulence aloft, and meteors. Infrasound sensors have been used for Nuclear Test Ban Treaty monitoring, for which there are a number of infrasonic listening stations throughout the world to detect large explosions and missile launches at a great distance. The National Oceanic and Atmospheric Administration has experimented with the use of infrasound for severe weather detection. Infrasound has been used to detect the occurrence of noise from a building implosion at a distance of twenty-five miles. It is likely that infrasound may be usable to detect and identify certain distant incidents/events of interest, such as objects dropping in water, explosions, wakes of aircraft and missiles, boats moving slowly, and vehicle and personnel movement associated with urban warfare. It is also likely that infrasound may be usable to detect natural events, such as clear air turbulence, distant forest fires, volcanic eruptions, meteors, tornadoes, landslides, and hurricanes.

Some weather-related natural events may currently be detected using electromagnetic (EM) detection systems, such as radar. However, such use of EM sensors has several drawbacks. First, EM sensors are unable to receive signal returns in clear air, where reflective targets (e.g., precipitation, particulate matter) are absent. Second, EM systems, being active, require scanning to locate an event. Third, EM systems, even weather radar (e.g., Doppler radar), have a limited range thereby requiring a large number of individual radar stations to provide detection over a large area. For example, the U.S. National Weather Service's Next-Generation Radar (NEXRAD) system uses 158 radar stations located across the U.S. to provide adequate detection.

Received infrasound signals are typically of low intensity (i.e., weak), and, as such, infrasound detection systems require highly sensitive microphones. A microphone is an acoustic transducer which produces an electrical signal as a result of a time-varying pressure in the air immediately in front of the microphone membrane. Several different types of microphones are available, with each type of microphone having a distinct transduction mechanism. In condenser and electret microphones, the transduction mechanism is based upon changes in the stored electric field energy. In a condenser microphone (also termed an air-condenser microphone), acoustic energy causes small movement of the microphone diaphragm (also termed a membrane), which serves as one plate of a parallel-plate capacitor. The condenser microphones are high-impedance devices with amplifiers located near the sensor itself. These microphones are stable with temperature and environmental changes because of stainless steel diaphragm. A condenser microphone requires a high DC voltage between the membrane and backplate, called the "polarization voltage." The polarization voltage is typically 200 volts for linear operation. In an air condenser microphone, the polarization voltage is applied from an external source. In an electret condenser microphone, the polarization voltage is applied by means of a thin layer of electret material which is deposited on the backplate and subsequently polarized.

Referring now to FIG. 1, a cutaway view of a conventional air condenser microphone is illustrated. In a condenser microphone, an incident sound pressure excites motion of a stretched membrane or diaphragm. The motion of the membrane changes the capacitance between the membrane and backplate, thereby producing a proportional output voltage. Hence, the performance of this type of microphone depends upon an electrical as well as mechanical system of the microphone.

When a fixed charge is applied on the plates of the membrane-backplate capacitor through a large resistor, the motion of the membrane changes the voltage between the plates. The charge is maintained by a high voltage, called a "polarization" voltage. This technique has the advantage of very low thermal noise, thus providing very low threshold detectability (i.e., increased sensitivity). However, this technique suffers at low frequencies due to the finite charging time of the capacitor.

The function of the mechanical system of a condenser microphone is to provide damping of the membrane motion for an optimally flat microphone frequency response. The microphone operates at frequencies below the fundamental resonant frequency of the stretched membrane. At frequencies approaching the resonant frequency, the response shows a pronounced peak if the membrane is not properly dampened. As the membrane vibrates, it compresses and expands the air layer in the gap and creates a "reaction" pressure, which opposes the motion of the membrane. The reaction pressure generates airflow which introduces damping primarily at two places: in the gap between the membrane and the backplate, and in the openings (holes and slots) in the backplate. A sufficiently small gap may, by itself, provide the necessary membrane damping, but the necessary small size would conflict with the requirements of electrical and mechanical stability. The damping is thus augmented by the flow of air through the holes and slots in the backplate, which provide large surface areas for viscous boundary layer damping.

The backchamber serves as a reservoir for the airflow through the openings in the backplate. If the cartridge were perfectly sealed, then a constant quantity of air would remain within the microphone interior. A vibration in ambient pressure would result in a pressure differential across the membrane, a shift in the membrane's static position, and a change in microphone sensitivity. For this reason, a capillary vent hole is introduced to provide static pressure equalization on the two sides of the membrane. The capillary vent hole leads from the backchamber to outside of the microphone. However, the pressure equalization system, like the electrical charging system, causes the response to roll-off at low frequencies.

Referring now to FIG. 2, the basic equivalent circuit of a known polarized microphone is illustrated. In FIG. 2(a), the microphone is shown as a variable capacitor, $C_t$ (because of diaphragm deflection due to time-varying outside pressure); $C_s$ is the stray capacitance (due to lead capacitance); $C_i$ is the input capacitance; $R_i$ is the input resistance to a preamplifier; and $C_c$ is a large blocking capacitor used to protect the preamplifier. To minimize the stray capacitance $C_s$, the preamplifier is located physically as close to the microphone cartridge as possible. The primary function of the preamplifier is to provide the low output impedance needed to drive the output cables and prevent loss of bandwidth due to cable capacitance, especially if the connecting cables are long. In FIG. 2(b), a well-regulated voltage source $E_0$ establishes a charge Q and voltage E on $C_t$ through resistor $R_c$, such that $Q=C_tE$. As the membrane of microphone vibrates, the microphone generates a time-varying current $I_t$.

There are several properties of condenser microphones which reduce their suitability for the detection of infrasound. For example, condenser microphones generally always have a very high resistance $R_c$ (on the order of 4 giga-ohms) inserted in series with polarized voltage as shown in FIG. 2(a). Also, condenser microphones have an input resistance $R_i$ to the pre-amplifier. These two resistances ($R_c$ and $R_i$) are both sources of Johnson noise, which elevates the noise floor of the microphone and thus reduces its sensitivity. Further, condenser microphones have a capillary vent. Also, a high polarization voltage has to be applied to such microphones. Finally, condenser microphones require an external polarization voltage (to be applied between the diaphragm and the backplate). Condenser microphones suffer at low frequencies due, at least in part, to the finite charging time of the capacitor.

Electret microphones (also termed electret-condenser microphones) are similar to condenser microphones, except electret microphones use a thin polymer film coated on the topside of the backplate. The film is polarized permanently at a level comparable to that used in condenser microphone. The linearity, frequency response, and transient response of electret microphones are similar to that of condenser microphones. The main advantage of the electret microphone is that it operates without the need for an external power supply, and is available at relatively low cost. In an electret microphone, the capacitor's charge is permanently embedded in a layer of electret material that forms the part of backplate. As it is unnecessary to apply a polarized voltage, the high resistance (adjacent the power supply) is eliminated; this makes the electret microphone more sensitive than a standard condenser microphone.

In addition to microphone sensitivity issues, infrasound signals are typically contaminated with wind noise and other background noise. As such, infrasound detection systems require some mechanism capable of screening wind and other noise from the infrasound signal. Known infrasound detection systems use a plurality of lengths of porous garden hose (often termed "soaker hose") arrayed outward from an infrasound microphone. The porous hose serves as a low-frequency mechanical filter. Each segment of porous hose is typically laid in a shallow, open ditch to further reduce wind noise. Referring now to FIG. 3, a top view block diagram of a known infrasound detection system is illustrated. In the prior art system 10 of FIG. 3, the infrasound microphone 12 is located at the center of twelve sections of porous hose 14. Each section 14 is typically 250-400 feet long. Thus, the overall size of such a system is typically 250,000-640,000 square feet. The very large size of the prior art system severely limits the portability of this system and limits the number of possible locations at which the system may be deployed. The large size also severely limits the ability to arrange multiple systems into an array, which is necessary to determine the direction of an infrasound signal.

As such, there is a need for an infrasound detection and measurement system capable of detecting very low intensity infrasound signals, and further capable of doing so in a small, portable form.

BRIEF SUMMARY OF THE INVENTION

The object of the present invention is to overcome the aforementioned drawbacks of large size and lack of portability and to provide an extremely low frequency (ELF) microphone and acoustic measurement system capable of infrasound detection in a portable and easily deployable form.

In one embodiment of the invention, an extremely low frequency electret microphone comprises a membrane, a backplate, and a backchamber. The backchamber is sealed to allow substantially no air exchange between the backchamber and outside the microphone.

The tension of the membrane may be less than about 1500 Newton per meter. For example, where the radius of the membrane is about 0.0342 meter, the tension of the membrane may be less than about 1000 Newton per meter. Further, the resonance frequency of the microphone may be less than about 1000 Hertz. Still further, the volume of the backchamber may be selected to produce a low-frequency air compliance that exceeds the compliance of the membrane by a factor of at least 3. In another example, where the radius of the membrane is about 0.0134 meter, the tension of the membrane may be less than about 400 Newton per meter. Further, the resonance frequency of the microphone may be less than about 1500 Hertz. Still further, the volume of the backchamber may be selected to produce a low-frequency air compliance that exceeds the compliance of the membrane by a factor of at least 10.

The backplate may define a plurality of holes and a slot may be defined between an outer diameter of the backplate and an inner wall of the microphone. The locations and sizes of the holes, the size of the slot, and the volume of the backchamber may be selected such that membrane motion is substantially critically damped. In one example, the radius of the membrane is about 0.0342 meter. In this example, the backplate defines six holes, each having a radius of about 0.00302 meter. The holes are evenly spaced along an imaginary circle on the backplate and a center of each hole is aligned with the imaginary circle. The center of the imaginary circle is located coincident with a center of the backplate, and the radius of the imaginary circle is about 0.0105 meter. The width of the slot is about 0.0144 meter and the area of the slot is about 0.00179 meter$^2$. The volume of the backchamber is about 0.0002 meter$^3$. In another example, the radius of the membrane is about 0.0134 meter. In this example, the radius of each of the six holes is about 0.002 meter and the radius of the imaginary circle is about 0.0117 meter. The width of the slot is about 0.00351 meter and the area of the slot is about 0.000258 meter$^2$. The volume of the backchamber is about 0.00005 meter$^3$.

In another embodiment of the invention, an extremely low frequency acoustic measurement system comprises an electret microphone having a membrane, a backplate, and a backchamber. The backchamber is sealed to allow substantially no air exchange between the backchamber and outside the microphone. The tension of the membrane may be less than about 1500 Newton per meter. The backplate defines a plurality of holes and a slot is defined between an outer diameter of the backplate and an inner wall of the microphone. The locations and sizes of the holes, the size of the slot, and the volume of the backchamber may be selected such that membrane motion is substantially critically damped.

The acoustic measurement system may further comprise a windscreen enclosing at least a portion of the microphone. The shape, size, and material of the windscreen may be selected such that substantially no convected pressure fluctuations reach the enclosed portion of the microphone and such that propagating infrasonic signals pass through the windscreen to the enclosed portion of the microphone with substantially no pressure amplitude reduction. The shape, size, and material of the windscreen further may be selected such that the propagating infrasonic signals pass through the windscreen to the enclosed portion of the microphone with an increased pressure amplitude. The ratio of the acoustic impedance of the windscreen material to the acoustic impedance of air may be less than about 40. The shape and size of the windscreen may be further selected such that substantially no Aeolian tones are generated at frequencies less than about 20 hertz.

In one embodiment of the invention, the selected windscreen shape is cylindrical. The internal diameter of the windscreen may range from about 0.0254 to 0.1016 meter the wall thickness of the windscreen may range from about 0.003175 to 0.01905 meter and the interior height of the windscreen may be about 0.23 meter. Specifically, the internal diameter may be about 0.0762 meter and the wall thickness may be about 0.0127 meter.

In another embodiment, the selected windscreen shape is spherical. The internal diameter of the windscreen may range from about 0.2286 to 0.3048 meter and a wall thickness of the windscreen may range from about 0.00635 to 0.01905 meter. Specifically, the internal diameter may be about 0.2286 meter and the wall thickness may be about 0.0127 meter. In at least one embodiment, the windscreen material may be selected from a group comprising closed-cell polyurethane foam, balsa wood, and silica tile.

BRIEF DESCRIPTION OF THE SEVERAL VIEWS OF THE DRAWINGS

Figure 4:
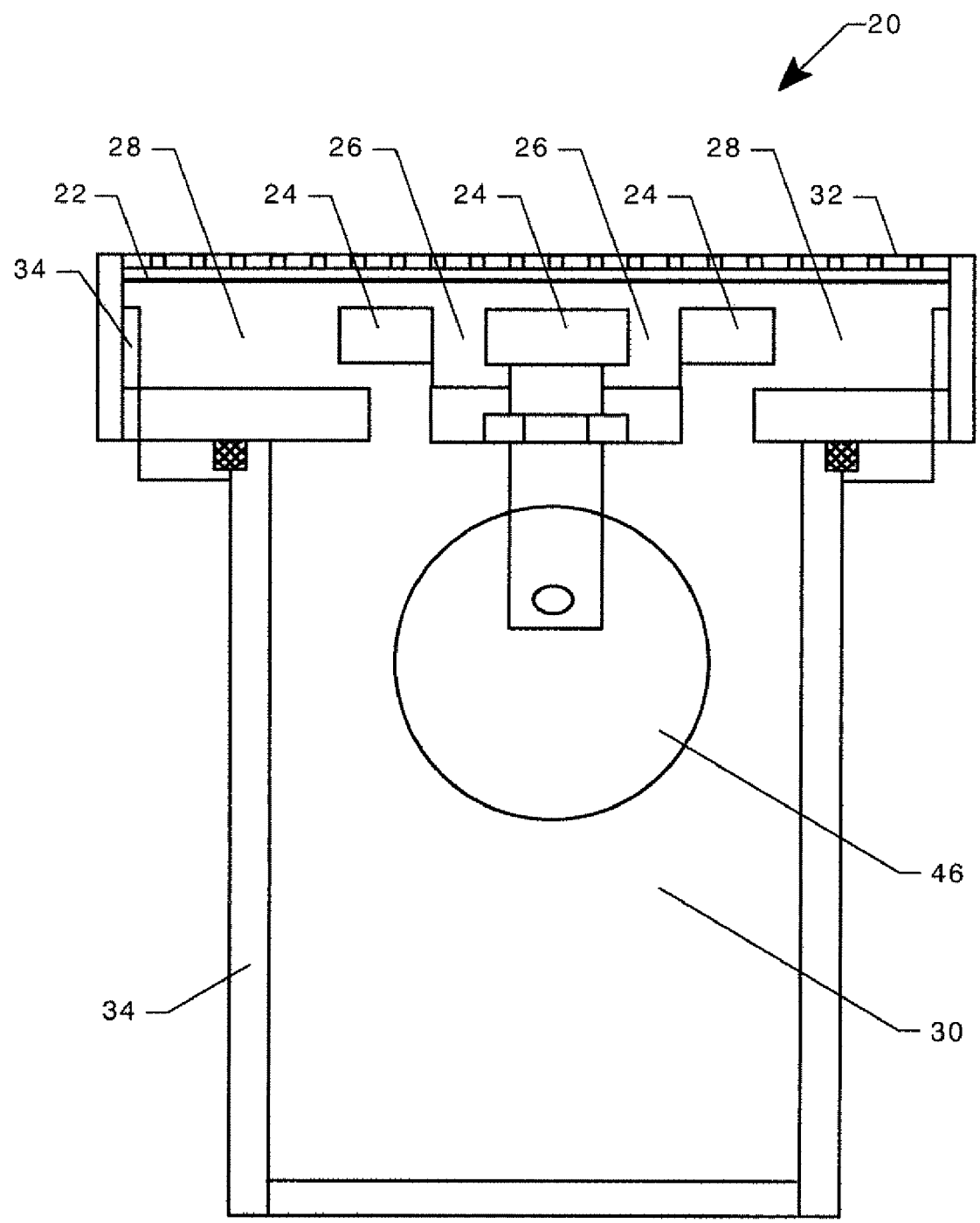
Figure 5:
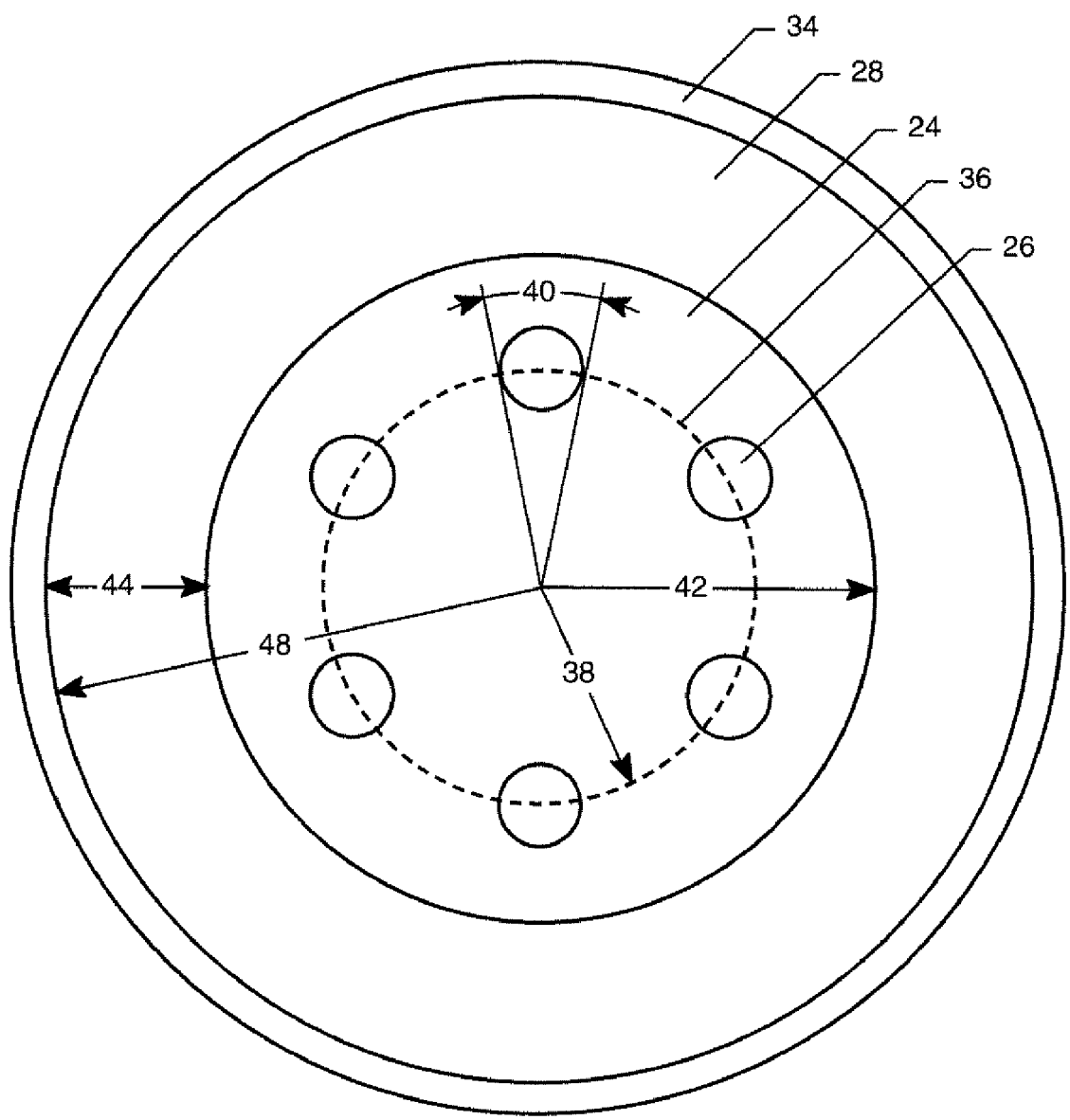
Figure 6A:
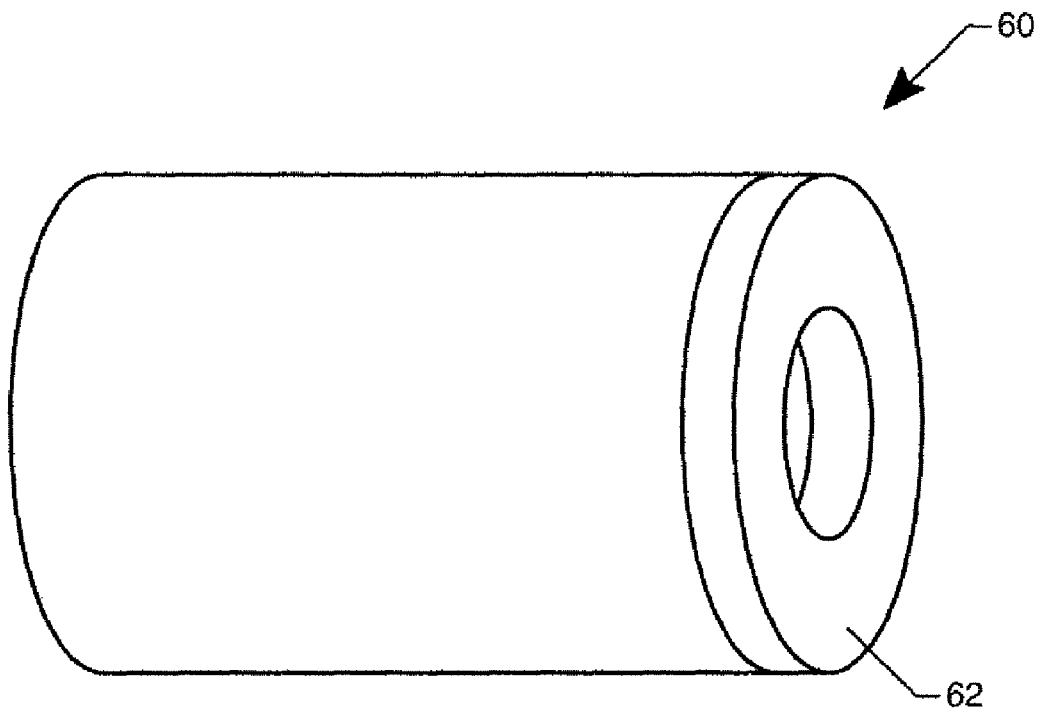
Figure 6B:
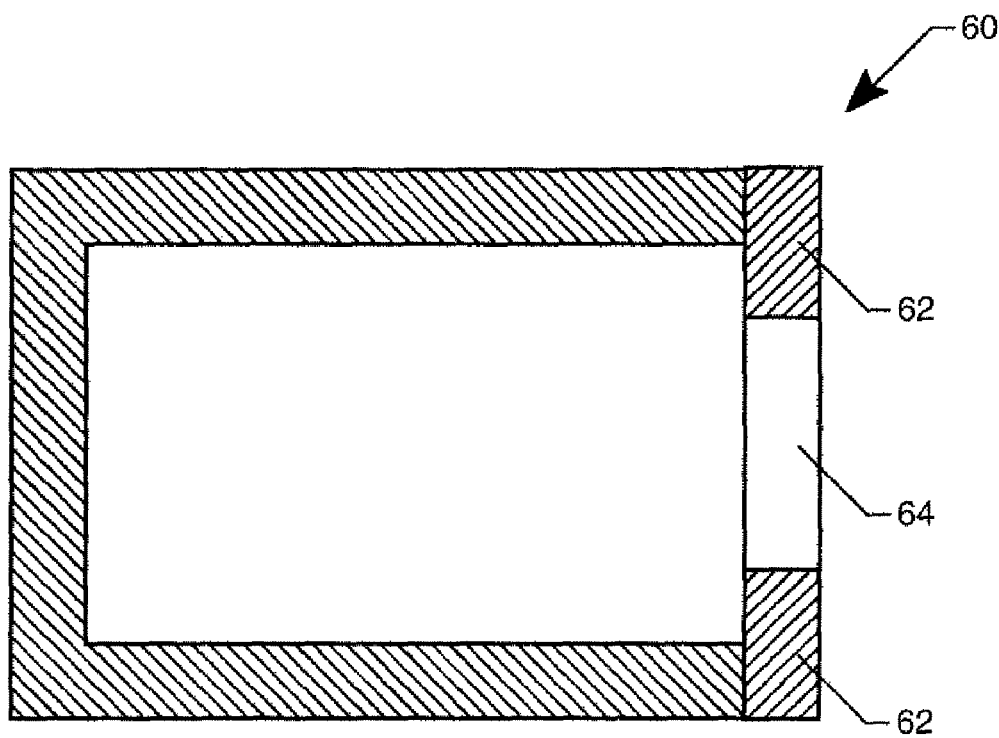
Figure 7:
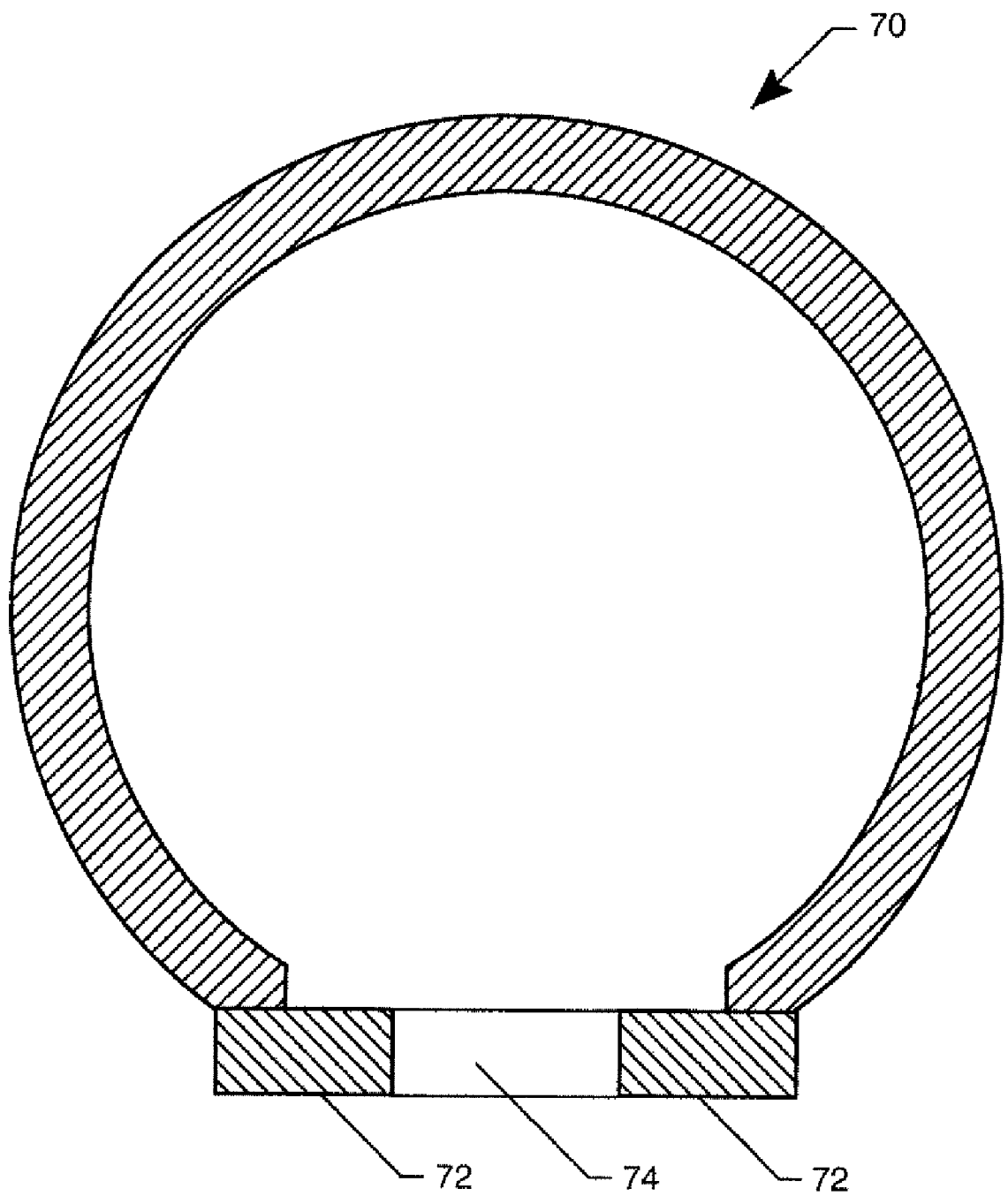

Having thus described the invention in general terms, reference will now be made to the accompanying drawings, which are not necessarily drawn to scale, and wherein:

FIG. 1 is a cross-sectional view of a conventional air condenser microphone;

FIG. 2 illustrates the basic equivalent circuit of a conventional polarized microphone;

FIG. 3 illustrates a top view block diagram of a conventional infrasound detection system;

FIG. 4 is a cross-sectional view of an extremely low frequency electret microphone, in accordance with one embodiment of the present invention;

FIG. 5 is a top view of a backplate of an extremely low frequency electret microphone, in accordance with one embodiment of the present invention;

FIG. 6A is a bottom perspective view of an infrasonic windscreen, in accordance with one embodiment of the present invention;

FIG. 6B is a cross-sectional view of the infrasonic windscreen of FIG. 6; and FIG. 7 is a cross-sectional view of an infrasonic windscreen, in accordance with an alternative embodiment of the present invention.

DETAILED DESCRIPTION OF THE INVENTION

The present invention(s) now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The infrasonic detection system of the present invention overcomes the shortcomings of known infrasonic microphones. The improved infrasound detection system of the embodiments of the invention comprises an infrasonic electret microphone and infrasonic windscreen. The infrasonic microphone is capable of being powered by a standard 9-volt battery. The infrasonic microphone has sensitivity greater than 500 millivolts per pascal (mV/Pa). The frequency response of the infrasonic microphone is from DC-200 Hz. The infrasonic microphone uses an improved infrasonic windscreen, as discussed in greater detail below. The infrasonic microphone and windscreen of the present invention provide a portable infrasonic detection system which can be moved throughout the world to detect man-made or natural events. Multiple microphones can be used in an array to determine the direction of an infrasonic signal.

As discussed above, conventional air-condenser and electret-condenser microphones have at least one capillary vent hole to provide static pressure equalization on the two sides of the membrane. The capillary vent hole leads from the backchamber to outside of the microphone. However, the capillary vent causes low-frequency acoustic signals to reach both sides of the membrane nearly simultaneously, thus negating a membrane displacement. Further, conventional air-condenser and electret-condenser microphones are constructed with the diaphragms at a very high tension. Tension is kept high to obtain a larger bandwidth (i.e., frequency range). As a result of the high tension, membrane compliance of such a conventional microphone is always smaller than the compliance of the ambient air surrounding the microphone. Air compliance is the displacement of the membrane per sound pressure if the membrane compliance is infinite. Air compliance is expressed in meters$^5$ per Newton ($m^5/N$).

The membrane compliance generally depends on the tension of the membrane. At frequencies below resonance, the membrane compliance is equal to the average membrane displacement per unit sound pressure. Membrane compliance is also expressed in meters$^5$ per Newton ($m^5/N$). The air compliance generally depends upon the acoustic impedance of the air that is in contact with the vibrating membrane, as represented by the resistance and mass of the air.

The extremely low frequency acoustic measurement system of the present invention comprises an electret microphone and an infrasonic windscreen enclosing the microphone cartridge. In contrast to conventional condenser and electret microphones, the infrasound microphone of the present invention comprises a backchamber that is sealed to allow substantially no air exchange between the backchamber and outside the microphone. The capillary vent of a conventional microphone has been eliminated from the microphone of the present invention.

To compensate for elimination of the capillary vent, several additional modifications are made. As with a conventional microphone, the microphone of the present invention is designed such that ambient air compliance is greater than membrane compliance. However, the tension of the diaphragm membrane of the present invention is kept very low as compared to a conventional microphone. For example, in a microphone having a membrane with a 0.076 meter diameter the membrane tension is less than about 1000 Newtons per meter (N/m), as compared with 2500 N/m for a typical conventional microphone. In another example, a microphone having a membrane with a 0.0268 meter diameter the membrane tension is less than about 400 N/m. In a conventional microphone, the membrane tension is very high (resulting in low compliance) to achieve a wideband frequency range. In the microphone of the present invention the membrane tension is much lower (resulting in high compliance) to increase the sensitivity. This increase in sensitivity comes at the expense of decreased bandwidth. This low membrane tension (as compared to conventional microphones) enables the microphone to sense very slight changes in ambient air pressure, thereby providing for greatly increased sensitivity.

Further, to compensate for elimination of the capillary vent and to compensate for the lower membrane tension, the backchamber of the microphone of the present invention preferably has a substantially larger volume than in a conventional microphone. This larger backchamber serves as a reservoir for the air flow through the openings in the backplate of the microphone. The larger backchamber volume provides sufficient space and time for air movement within the microphone (caused by movement of the membrane) to decay or dissipate, thereby preventing backpressure on the membrane.

As mentioned above, the microphone of the present invention comprises a backplate which defines a plurality of holes. Additionally, a slot is defined between the outer diameter of the backplate and the inner wall of the microphone. The number, locations and sizes of the holes, the size of the slot, and the inner volume of the backchamber are selected such to allow enough air flow that the membrane motion is critically damped. Critical damping occurs when the damping coefficient is equal to the undamped resonant frequency of the membrane. Critical damping is determined by the maximum value of the damping coefficient at which a peak in the spectrum appears. Further, the locations and sizes of the holes and the size of the slot can be selected to provide proper damping of the membrane motion for optimally flat microphone frequency response at frequencies down to DC (static air pressure).

The microphone of the present invention has been designed to achieve very high threshold detectability (i.e., the ability to detect very low sound pressure). As such, the microphone has achieved sensitivity greater than 500 mV/pascal at extreme low frequencies (i.e., at infrasonic frequencies). As compared to conventional microphones, overall bandwidth is decreased (this infrasonic microphone is designed to detect signals with frequencies less than about 20 Hz), but sensitivity is greatly increased.

Referring now to FIG. 4, a cross-sectional view of an extremely low frequency electret microphone is illustrated, in accordance with one embodiment of the present invention. The microphone 20 comprises a microphone body 34, a membrane 22, a backplate 24, a grid cover 32, a backchamber 30 formed by the microphone body and enclosing a low-noise preamplifier 46. As discussed above, an incident sound pressure excites motion of the membrane 22. The motion of the membrane changes the capacitance between the membrane and backplate 24, thereby producing a proportional output voltage at the preamplifier 46. The output of the microphone is received via a sealed electrical connection (not illustrated) through the wall of the microphone. No capillary vent is provided, and the backchamber 30 is sealed to prevent substantially all air exchange with the outside of the microphone.

Also as discussed above, the backplate defines a plurality of holes 26 (two of which are visible in FIG. 4). Additionally a slot 28 is defined between the outer diameter of the backplate and the wall of the microphone. The number, locations and sizes of the holes, the size of the slot, and the inner volume of the backchamber are selected such to allow enough air flow to provide proper damping of the membrane motion. Referring now to FIG. 5, a top view of a backplate showing the holes and slot is illustrated, in accordance with one embodiment of the present invention. Backplate size may be defined by its radius 42. The backplate 24 comprises six holes 26 in this embodiment. Hole depth is the same as backplate thickness, as the holes are through-holes. Hole position may be defined by an imaginary circle (which may also be termed a centerline) 36 which has a center that is coincident with the center of the backplate and a radius 38. The center of each hole is aligned with the centerline. Hole size may be defined by the radius or area of each hole. Hole size may also be defined by the angle 40 formed between two lines extending from the center of the backplate and tangent to a hole. FIG. 5 also illustrates the position of the slot 28 between the backplate 24 and the microphone wall 34. The slot size may be defined by its width 44. The area of the slot may be defined by the area of the circle having a radius 48 minus the area of the circle having a radius 42. The specific dimensions of microphones according to two different exemplary embodiments are provided below.

In one exemplary embodiment of the invention, an infrasonic microphone comprises a membrane having a diameter of approximately 2.6929 inches (0.0682 meter). The membrane of this infrasonic microphone may have the following characteristics/dimensions:
radius=0.0342 meter;
thickness=$2\times10^{-5}$ meter;
density=8800 kilogram per meter$^3$ (kg/m$^3$);
tension=1000 N/m;
surface density=0.176 kilogram per meter$^2$ (kg/m$^2$); and
stress=75.3778 pounds per square inch (PSI).

Further, the infrasonic microphone comprises an air layer which may have the following characteristics/dimensions:
gap=$5.0\times10^{-5}$ meter;
density=1.2050 kg/m$^3$;
viscosity=$1.8\times10^{-5}$ pascal-seconds;
sound velocity through the air gap=290.2 meters per second; and
gamma=1.4 (the ratio of Cp to Cv, where Cp is specific heat at constant pressure and Cv is specific heat at constant volume).

Further, the infrasonic microphone comprises a slot (i.e., a space between the outer edge of the backplate and the inner wall of the microphone) which may have the following characteristics/dimensions:
distance from center of backplate=0.0198 meter;
width=0.0144 meter;
depth=0.00254 meter; and
area=0.00179 meter$^2$.

Further, the backplate of the infrasonic microphone defines six through-holes, and each hole may have the following characteristics/dimensions:
   distance from center of backplate to center of hole=0.0105 meter;
   radius=0.00302 meter;
   depth=0.00254 meter;
      angle between two lines going from center of backplate to either side edge of hole=33 degrees; and
   area=0.000286 meter$^2$.

The infrasonic microphone may have the following further characteristics/dimensions:
   volume of backchamber=0.0002 meter$^3$;
   membrane mass=63.86 kg/m$^4$;
   membrane compliance=3.8×10$^{-10}$ meter$^5$/Newton; and
   air gap compliance=1.4×10$^{-9}$ meter$^5$/Newton.

In another exemplary embodiment of the invention, an infrasonic microphone comprises a membrane having a diameter of approximately 1.05 inches (0.0268 meter). The membrane of this infrasonic microphone may have the following characteristics/dimensions:
   radius=0.0134 meter;
   thickness=2.54×10$^{-5}$ meter;
   density=8000 kg/m$^3$;
   tension=400 N/m;
   surface density=0.1780 kg/m$^2$; and
   stress=47.4045 PSI.

Further, the infrasonic microphone comprises an air layer which may have the following characteristics/dimensions:
   gap=2.54×10$^{-5}$ meter;
   density=1.2050 kg/m$^3$;
   viscosity=1.8×10$^{-5}$ pascal-second;
   sound velocity through the air gap=290.2 meters per second; and
   gamma=1.4

Further, the infrasonic microphone comprises a slot which may have the following characteristics/dimensions:
   distance from center of backplate=0.0117 meter;
   width=0.00351 meter;
   depth=0.00114 meter; and
   area=0.000258 meter$^2$.

Further, the backplate of the infrasonic microphone defines six through-holes, and each hole may have the following characteristics/dimensions:
   distance from center of backplate to center of hole=0.00526 meter;
   radius=0.002 meter;
   depth=0.045 meter;
      angle between two lines going from center of backplate to either side edge of hole=43.5 degrees; and
   area=1.26×10$^{-5}$ meter$^2$.

The infrasonic microphone may have the following further characteristics/dimensions:
   volume of the backchamber=5×10$^{-5}$ meter$^3$;
   membrane mass=480 kg/m$^4$;
   membrane compliance=3.2×10$^{-11}$ meter$^5$/Newton; and
   air gap compliance=3.5×10$^{-10}$ meter$^5$/Newton.

The resonant frequencies of the infrasonic microphone of the present invention may be 1353.99 Hz and 3108.01 Hz in the respective embodiments listed above.

As discussed above, the locations and sizes of the holes, the size of the slot, and the volume of the backchamber are selected such to allow enough air flow to provide proper (i.e., critical) damping of the membrane motion. Thus, it should be appreciated that the number, locations and sizes of the holes, the size of the slot, and the volume of the backchamber specified in the above two examples are merely illustrative and not exclusive or exhaustive. The number, locations and sizes of the holes, the size of the slot, and the inner volume of the backchamber all may vary from the above examples, as long as the specifications are selected to allow enough air flow to provide proper damping of the membrane motion.

In addition to the novel infrasonic microphone as described above, the infrasonic detection system of the present invention comprises a compact and structurally sound windscreen for microphones deployed in the field for the detection of outdoor infrasound. The windscreen principle is based on the high penetrating capability of infrasound through barriers, which is dependent upon the acoustic impedance ratio (wall-to-air) and wall thickness. The infrasonic windscreen of the present invention is designed for service at frequencies below about 20 Hz, and can be fabricated from materials having a low acoustic impedance, and it can meet the following requirements: (1) reduction of noise generated by ambient wind near the microphone; (2) transmission of infrasound propagating to the microphone position; (3) all-weather operation (based on limited water absorption); and (4) avoidance of sounds within the infrasonic passband (<20 Hz) due to vortex shedding (Aeolian tones).

The operating principle of the infrasonic windscreen of the present invention is based on the high penetrating capability of infrasound through solid barriers. Thus a windscreen having solid, non-porous walls will block convected pressure fluctuations from the wind, while transmitting acoustic waves within the infrasonic passband. The transmission coefficient depends strongly upon the ratio of the acoustic impedance of the windscreen material to that of air. Several materials having a low impedance ratio, namely polyurethane foam, Space Shuttle tile material (i.e., silica tile), and balsa wood have proved suitable in that they permit high transmission of infrasound with walls of practical thickness.

Consider the classical problem of sound transmission through a solid wall with air on either side. The sound power transmission coefficient from medium 1 to medium 3 through a wall may be expressed by the formula:

$$|T| = \frac{1}{\cos^2 x + \frac{1}{4}\left(\frac{Z_2}{Z_1} + \frac{Z_1}{Z_2}\right)^2 \sin^2 x}, \quad (1)$$

$$\text{where } x = \frac{2\pi f W}{c_2}, \quad (2)$$

f is the frequency, W is the wall thickness, $Z_1$ is the acoustic impedance of air, $Z_2$ is the acoustic impedance of the wall material, and $C_2$ is the speed of sound in the wall. Equations (1) and (2) reveal that a high transmission coefficient is favored by a low frequency, low impedance ratio, and small wall thickness. The transmission pass band is taken here, for design purposes, to span the infrasonic region (i.e., at frequencies below 20 Hz). The impedance ratio depends upon the selection of suitable materials, and the wall thickness is limited by considerations of structural stability. For illustration, consider the transmission coefficient for a material with a low impedance ratio (for example, balsa wood, having an impedance ratio of 323) and with a high impedance ratio (for example, steel, having an impedance ratio of 113,253). A cutoff frequency ($f_c$) is defined as the location of the half-power point. For a balsa windscreen having a wall thickness of 0.0127 m (½ in.), the cutoff frequency is 20 Hz, which is well-suited for infrasonic detection. For a steel windscreen having the same wall thickness, the cutoff frequency is 0.075

Hz, confining the transmission to the far infrasound and therefore not well-suited for infrasonic detection.

Several candidate materials were considered for an infrasonic windscreen. Most woods have an impedance ratio near 3000 or higher, in which case transmission below 20 Hz requires walls so thin as to cause structural stability problems. For example, windscreens made of white pine and cedar require a wall thickness no greater than 0.003175 m (⅛in.) to achieve a cutoff frequency of 20 Hz. However, such a wall thickness of white pine or cedar was found to develop cracks in the sidewalls and therefore proved structurally inadequate. The remaining candidate materials—balsa, 15 pounds/ft³ closed-cell polyurethane foam, and Space Shuttle tile material (i.e., silica tile)—were found to achieve the desired cutoff frequency of 20 Hz, with a structurally sound 0.0127 m (½in.) wall, and thus proved favorable for field application. While balsa and Space Shuttle tile material revealed comparable acoustical performance for the same geometry, these materials had drawbacks which render them less desirable than the polyurethane foam. Specifically, the use of balsa would require a protective film for outdoor service, and the use of Space Shuttle tile material would be constrained by its high cost. As such, the 15 lb/ft³ closed-cell polyurethane foam is a preferred material for the infrasonic windscreen of the present invention.

Referring now to FIGS. 6A and 6B, a bottom perspective view and a cross-sectional view of an infrasonic windscreen are illustrated, respectively, in accordance with one embodiment of the present invention. In the embodiment of FIGS. 6A and 6B, a windscreen 60 is in the shape of a hollow cylinder. The cylinder is closed at one end (i.e., the top of the cylinder), and the opposite end (i.e., the bottom of the cylinder) is fitted with a cap 62 defining a hole 64 into which the microphone may be installed such that at least the portion of the microphone containing the membrane is enclosed within the windscreen. It is preferable that the microphone be positioned such that the membrane is approximately in the center of the windscreen. When the microphone is installed, any gap between the microphone body and the hole 64 is sealed to allow substantially no air infiltration through the gap. The internal diameter of the windscreen 60 may range from about 0.0254 to 0.1016 meters (1 to 4 inches), the wall thickness from about 0.003175 to 0.01905 m (⅛ to ¾ in.), and the interior height may be set at about 0.23 m (9 in.). In one tested embodiment, the internal diameter is 0.0762 m (3 in.) and the wall thickness is 0.0127 m (½in.). The cylindrical polyurethane windscreen of FIGS. 6A and 6B achieve the following performance specifications: (1) wind noise attenuation of 10 to 20 dB at 0.7 to 20 Hz; (2) a transmission coefficient≧0 dB at 10 to 20 Hz; (3) Aeolian tones at 23 Hz; and (4) water retention of a maximum of about 2.7%. Limited water retention is an important specification for the suitability of a material for outdoor service, and the water retention of the cylindrical polyurethane windscreen of one embodiment of the invention indicated excellent suitability for outdoor service.

Even though cylindrical polyurethane infrasonic windscreens serve well as infrasonic wind screens there is one drawback. Because of the cylindrical shape, Aeolian tones are occasionally produced. To remove these Aeolian tones, the shape of infrasonic windscreen was changed from cylindrical to spherical in an alternative embodiment of the invention. Referring now to FIG. 7, a cross-sectional view of a spherical infrasonic windscreen is illustrated, in accordance with an alternative embodiment of the present invention. In the embodiment of
FIG. 7, a windscreen 70 is in the shape of a hollow sphere. The bottom portion of the sphere is open and is fitted with a cap 72 defining a hole 74 into which the microphone may be installed. The internal diameter of the windscreen 70 may range from about 0.2286 to 0.3048 meters (9 to 12 inches) and the wall thickness from about 0.00635 to 0.01905 meters (0.25 to 0.75 inches). In one tested embodiment, the internal diameter is 0.2286 meters (9 inches) and the wall thickness is 0.0127 meters (0.5 inches). The spherical polyurethane windscreen of FIG. 7 achieves the following performance specifications: (1) wind noise attenuation of 25 to 45 dB at 0.7 to 20 Hz; (2) a transmission coefficient of −30 dB at 10 to 20 Hz; (3) no Aeolian tones; and (4) water retention of a maximum of about 2.1%.

An infrasonic plane wave incident upon the windscreen can be resolved into a pair of propagating cylinder waves, comprising an incoming wave, converging toward the central axis of the windscreen, and an outgoing wave, diverging from the central axis of the windscreen. A microphone located at the center of the windscreen thus detects the incoming and outgoing waves in superposition. However, because a cylinder wave has a logarithmic singularity at its center, the acoustical particle velocities of the incoming and outgoing waves must be exactly equal to effect their cancellation. The respective phase relationships between acoustical particle velocity and pressure are such that the superposition of the incoming and outgoing waves renders the cancellation of the acoustical particle velocities, but the reinforcement of the pressure amplitudes. Consequently, the superposition of the pressure amplitudes of the two waves results in a doubling of the acoustic pressure detected by the microphone. Hence, the windscreen affords an inherent gain in transmitted pressure amplitude of about 6 decibels over at least some of the infrasonic frequency range. This effect is not apparent in windscreens based on alternative physical principles.

Water retention is an important specification for the suitability of a material for outdoor service. The polyurethane foam windscreen retained 2.54% water by weight when removed from immersion in water, therefore indicating excellent suitability for outdoor service.

The novel infrasonic microphone and compact windscreen of the present invention enable many applications and uses that are not possible with the known infrasonic detection systems (i.e., with the soaker-hose type windscreen). For example, the microphone and windscreen of the present invention can be: (1) flown on unmanned aerial vehicles for detection of underground facilities or other activities; (2) mounted atop the vehicles of tornado chasers to obtain the acoustic signatures of tornadoes, which may be analyzed to create a method of detecting tornadoes from long distances; or (3) deployed in an inconspicuous manner for applications for border control, security, and detection of personnel or vehicle intrusion in controlled areas. Importantly, the compact windscreens will allow the microphones to be deployed via air drops, which was not previously possible. Further, the microphone and windscreen of the present invention can be carried on space missions to other planets that have an atmosphere. It may be possible to detect infrasonic sound and thereby deduce the nature of certain activities on such planets, including speed of flow, potential obstructions, and other yet-to-be-determined activities.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An extremely low frequency electret microphone comprising:
   a membrane;
   a backplate; and
   a backchamber;
   wherein the backchamber is sealed to allow substantially no air exchange between the backchamber and outside the microphone, and wherein one or more of a tension of the membrane, a structure of the backplate, and a volume of the backchamber is selected to compensate for having substantially no air exchange between the backchamber and outside the microphone.

2. The extremely low frequency electret microphone of claim 1, wherein the tension of the membrane is less than about 1500 Newton per meter.

3. The extremely low frequency electret microphone of claim 2, wherein a radius of the membrane is about 0.0342 meter, and wherein the tension of the membrane is less than about 1000 Newton per meter.

4. The extremely low frequency electret microphone of claim 3, wherein a resonance frequency of the microphone is less than about 1000 Hertz.

5. The extremely low frequency electret microphone of claim 3, wherein the volume of the backchamber is selected to produce a low-frequency air compliance that exceeds the compliance of the membrane by a factor of at least 3.

6. The extremely low frequency electret microphone of claim 2, wherein a radius of the membrane is about 0.0134 meter, and wherein the tension of the membrane is less than about 400 Newton per meter.

7. The extremely low frequency electret microphone of claim 6, wherein a resonance frequency of the microphone is less than about 1500 Hertz.

8. The extremely low frequency electret microphone of claim 6, wherein the volume of the backchamber is selected to produce a low-frequency air compliance that exceeds the compliance of the membrane by a factor of at least 10.

9. The extremely low frequency electret microphone of claim 1, wherein the backplate defines a plurality of holes, wherein a slot is defined between an outer diameter of the backplate and an inner wall of the microphone, and wherein locations and sizes of the holes and a size of the slot are selected such that membrane motion, is substantially critically damped.

10. The extremely low frequency electret microphone of claim 9, wherein a radius of the membrane is about 0.0342 meter, wherein the backplate defines six holes, wherein a radius of each hole is about 0.00302 meter, wherein the holes are evenly spaced along an imaginary circle on the backplate and a center of each hole is aligned with the imaginary circle, wherein a center of the imaginary circle is located coincident with a center of the backplate, wherein a radius of the imaginary circle is about 0.0105 meter, wherein a width of the slot is about 0.0144 meter and an area of the slot is about 0.00179 meter$^2$, and wherein the volume of the backchamber is about 0.0002 meter$^3$.

11. The extremely low frequency electret microphone of claim 9, wherein a radius of the membrane is about 0.0134 meter, wherein the backplate defines six holes, wherein a radius of each hole is about 0.002 meter, wherein the holes are evenly spaced along an imaginary circle on the backplate and a center of each hole is aligned with the imaginary circle, wherein a center of the imaginary circle is located coincident with a center of the backplate, wherein a radius of the imaginary circle is about 0.0117 meter, wherein a width of the slot is about 0.00351 meter and an area of the slot is about 0.000258 meter$^2$, and wherein the volume of the backchamber is about 0.00005 meter$^3$.

12. An extremely low frequency acoustic measurement system comprising:
    an electret microphone comprising a membrane, a backplate, and a backchamber;
    wherein the backchamber is sealed to allow substantially no air exchange between the backchamber and outside the microphone, and wherein one or more of a tension of the membrane, a structure of the backplate, and a volume of the back chamber is selected to compensate for having substantially no air exchange between the backchamber and outside the microphone.

13. The acoustic measurement system of claim 12, wherein the tension of the membrane is less than about 1500 Newton per meter.

14. The acoustic measurement system of claim 12, wherein the backplate defines a plurality of holes, wherein a slot is defined between an outer diameter of the backplate and an inner wall of the microphone, and wherein locations and sizes of the holes and a size of the slot are selected such that membrane motion is substantially critically damped.

15. An extremely low frequency electret microphone comprising:
    a membrane;
    a backplate;
    a backchamber; and
    a low-noise pre-amplifier housed within the backchamber;
    wherein the backchamber is sealed to allow substantially no air exchange between the backchamber and outside the microphone, and wherein one or more of a tension of the membrane, a structure of the backplate, and a volume of the backchamber is selected to compensate for having substantially no air exchange between the backchamber and outside the microphone.

16. The extremely low frequency electret microphone of claim 15, wherein the tension of the membrane is less than about 1500 Newton per meter.

17. The extremely low frequency electret microphone of claim 16, wherein a radius of the membrane is about 0.0342 meter, and wherein the tension of the membrane is less than about 1000 Newton per meter.

18. The extremely low frequency electret microphone of claim 17, wherein a resonance frequency of the microphone is less than about 1000 Hertz.

19. The extremely low frequency electret microphone of claim 17, wherein the volume of the backchamber is selected to produce a low-frequency airy compliance that exceeds the compliance of the membrane by a factor of at least 3.

20. The extremely low frequency electret microphone of claim 16, wherein a radius of the membrane is about 0.0134 meter, and wherein the tension of the membrane is less than about 400 Newton per meter.

21. The extremely low frequency electret microphone of claim 20, wherein a resonance frequency of the microphone is less than about 1500 Hertz.

22. The extremely low frequency electret microphone of claim 20, wherein the volume of the backchamber is selected to produce a low-frequency air compliance that exceeds the compliance of the membrane by a factor of at least 10.

23. The extremely low frequency electret microphone of claim 15, wherein the backplate defines a plurality of holes, wherein a slot is defined between an outer diameter of the backplate and an inner wall of the microphone, and wherein locations and sizes of the holes and a size of the slot are selected such that membrane motion is substantially critically damped.

24. The extremely low frequency elcetret microphone of claim 23, wherein a radius of the membrane is about 0.0342 meter, wherein the backplate defines six holes, wherein a radius of each hole is about 0.00302 meter, wherein the holes are evenly spaced along an imaginary circle on the backplate and a center of each hole is aligned with the imaginary circle, wherein a center of the imaginary circle is located coincident with a center of the backplate, wherein a radius of the imaginary circle is about 0.0105 meter, wherein a width of the slot is about 0.0144 meter and an area of the slot is about 0.00179 meter$^2$, and wherein the volume of the backchamber is about 0.0002 meter$^3$.

25. The extremely low frequency electret microphone of claim 23, wherein a radius of the membrane is about 0.0134 meter, wherein the backplate defines six holes, wherein a radius of each hole is about 0.002 meter, wherein the holes are evenly spaced along an imaginary circle on the backplate and a center of each hole is aligned with the imaginary circle, wherein a center of the imaginary circle is located coincident with a center of the backplate, wherein a radius of the imaginary circle is about 0.0117 meter, wherein a width of the slot is about 0.00351 meter and an area of the slot is about 0.000258 meter$^2$, and wherein the volume of the backchamber is about 0.00005 meter$^3$.

* * * * *